United States Patent
Jeong

(10) Patent No.: US 8,645,614 B2
(45) Date of Patent: Feb. 4, 2014

(54) METHOD AND APPARATUS FOR MANAGING DATA OF FLASH MEMORY VIA ADDRESS MAPPING

(75) Inventor: Seong-hoon Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 869 days.

(21) Appl. No.: 12/557,068

(22) Filed: Sep. 10, 2009

(65) Prior Publication Data
US 2010/0199024 A1  Aug. 5, 2010

(30) Foreign Application Priority Data
Feb. 3, 2009  (KR) .................. 10-2009-0008386

(51) Int. Cl.
*G06F 12/00* (2006.01)
(52) U.S. Cl.
USPC .................................. 711/103; 711/E12.008
(58) Field of Classification Search
USPC .................................................. 711/E12.008
See application file for complete search history.

(56) References Cited

U.S. PATENT DOCUMENTS

2008/0098192 A1 * 4/2008 Im et al. .................. 711/170

OTHER PUBLICATIONS

Kim, Jesung, et al., "A Space-Efficient Flash Translation Layer for Compactflash Systems", IEEE Transactions on Consumer Electronics, May 2002 vol. 48, No. 2, pp. 366-375.

* cited by examiner

*Primary Examiner* — Larry Mackall
(74) *Attorney, Agent, or Firm* — Sughrue Mion, PLLC

(57) ABSTRACT

A method of managing data of a flash memory is provided. The method comprises: assigning a logical area of the flash memory as a user block area in which user storage data is stored, and a free block area in which the user storage data is temporarily stored when changing the user storage data; and, when a first data unit of user storage data received from a host is different from a second data unit used while mapping a physical address and a logical address of the flash memory where the user storage data is stored, assigning a predetermined logical area of the flash memory as a cache block area in which the user storage data received from the host is temporarily stored.

33 Claims, 12 Drawing Sheets

METHOD AND APPARATUS FOR MANAGING DATA OF FLASH MEMORY VIA ADDRESS MAPPING

CROSS-REFERENCE TO RELATED PATENT APPLICATION

This application claims the benefit of Korean Patent Application No. 10-2009-0008386, filed on Feb. 3, 2009, in the Korean Intellectual Property Office, the disclosure of which is incorporated herein in its entirety by reference.

BACKGROUND OF THE INVENTION

1. Field of the Invention

The present invention relates to managing a flash memory and data.

2. Description of the Related Art

Flash memories have low power consumption, and are nonvolatile and stable. Also, manufacturing costs of the flash memories are continuously decreasing according to the development of manufacturing processes, and thus flash memories have become widely used.

A disc storage medium can perform an overwrite operation, where new data is overwritten on previous data, so as to update data, but such an in-place update is not possible in a flash memory. Accordingly, in order to update data stored in a flash memory, new data is stored after deleting previously stored data.

Also, a physical address where data is actually stored in a flash memory may not correspond with a logical address related to processing and operating data. Accordingly, software that maps the physical and logical addresses and controls data input/output is required in order to smoothly relay data between a host and the flash memory.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method of managing data via a logical address mapping technique by assigning a predetermined logical area of a flash memory as a cache block area, and a flash memory device using the method.

According to an aspect of the present invention, there is provided a method of managing data of a flash memory, the method including: assigning a logical area of the flash memory as a user block area in which user storage data is stored, and a free block area in which the user storage data is temporarily stored so as to change a logical address of the user storage data; and assigning a predetermined logical area of the flash memory as a cache block area in which the user storage data received from the host is temporarily stored, when a first data unit of user storage data received from a host is different from a second data unit used while mapping a physical address to a logical address of the flash memory where the user storage data is stored.

The method may further include: receiving a data writing request from the host; and storing the user storage data received from the host in at least one of the user block area, the free block area, and the cache block area, based on a result of comparing a size of the user storage data received from the host and the second data unit.

The storing of the user storage data may include storing the first data unit of the user storage data in the cache block area if a result of the comparing determines that the first data unit of the user storage data has a different size from the second data unit.

The storing of the user storage data may include storing the first data unit of the user storage data in at least one of the user block area and the free block area if a result of the comparing determines that the first data unit has the same size as the second data unit.

The method may further include: receiving a data reading request from the host; and reading data corresponding to the data reading request from at least one of the user block area, the free block area, and the cache block area.

The method may further include performing a data flush operation on a predetermined block of the user block area, by using data stored in the cache block area.

The performing of the data flush operation may include: reading at least one piece of data having a size equal to or smaller than the second data unit from the cache block area and copying the at least one piece of data in a predetermined block of the user block area, and deleting data of a first cache block, which is data stored in the cache block area that is copied in the user block area.

The method may further include assigning a predetermined area of the flash memory as at least one log block for writing update data newly input in a predetermined block of the user block area. The method may further include rearranging the update data stored in the log block, based on whether data is continuously stored in the log block.

The rearranging of the update data may include performing a switch operation that rearranges the update block by reassigning the log block in the user block area, if the data is continuously stored in one log block of a predetermined block of the user block area.

The rearranging of the update data may further include performing a merge operation, which collects and continuously stores user storage data that is dispersively stored, on one block by using a predetermined free block of the free block area, and rearranges the update data by reassigning the predetermined free block as the user block area, if the user storage data corresponding to the predetermined block of the user block area is not stored in the cache block area.

According to another aspect of the present invention, there is provided a flash memory device including: a memory unit that includes at least one flash memory; a data input and output unit that inputs and outputs user storage data of the memory unit and a host; and a flash memory management unit that manages a data storage area and data of the flash memory by assigning a logical area of the flash memory as a user block area in which the user storage data is stored, a free block area to which the user storage data is temporarily stored so as to change a logical address of the user storage data, and, if a first data unit of user storage data received from the host is different from a second data unit used while mapping a physical address to a logical address of the flash memory where user storage data is stored, a cache block area in which the user storage data received from the host is temporarily stored.

When a data writing request is received from the host, the flash memory management unit may store user storage data that is different in size from the second data unit in the cache block area.

When a data reading request is received from the host, the flash memory management unit may read first data, which is the same size as the second data unit from among data corresponding to the data reading request, from the cache block area when the first data is stored in the cache block area.

The flash memory management unit may perform a data flush operation on a first cache block that is copied to the user block area.

The flash memory management unit may perform an operation of rearranging update data stored in a log block, based on whether the update data is continuously stored in the log block.

According to another aspect of the present invention, there is provided a computer readable recording medium having recorded thereon a program for executing the method of above.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Hereinafter, a method of managing data of a flash memory and a storage space of the flash memory, and a flash memory device using the method according to exemplary embodiments of the present invention will be described more fully with reference to FIGS. 1 through 13.

Figure 1:
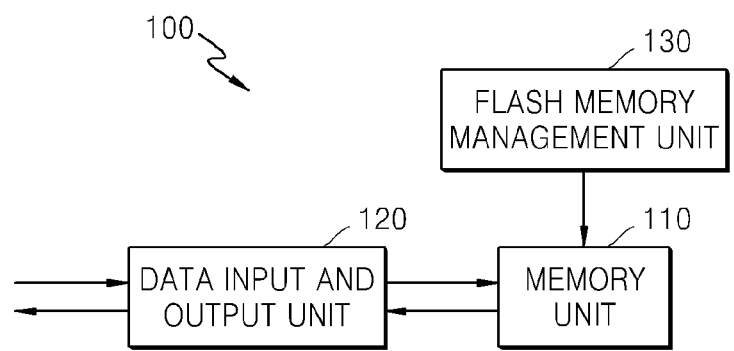
FIG. 1 is a block diagram of a flash memory device according to an exemplary embodiment of the present invention.

FIG. 1 is a block diagram of a flash memory device 100 according to an exemplary embodiment of the present invention.

The flash memory device 100 according to the current exemplary embodiment of the present invention includes a memory unit 110, a data input and output unit 120, and a flash memory management unit 130.

The memory unit 110 includes at least one flash memory. The flash memory may be a NAND flash memory.

Data is transferred between a host and the flash memory via the data input and output unit 120. In order to store data in the flash memory, the host may transmit a data storing request or a data writing request and data to be stored to the flash memory device 100. Also, in order to read data from the flash memory, the host may transmit a data reading request to the flash memory device 100 and extract data therefrom.

The data input and output unit 120 may include an interface between the flash memory device 100 and the host or a data controller. Also, the data input and output unit 120 may include a flash memory controller that transmits data to the flash memory of the memory unit 110 in the flash memory device 100 or receives data from the flash memory.

The flash memory management unit 130 manages data and the flash memory by controlling storing, reading, and transferring of data in the flash memory of the memory unit 110.

In order to effectively manage data, the flash memory management unit 130 may assign the flash memory as a logical block area including a user block area, a free block area, and a cache block area.

The user block area is a logical block area in which data to be stored by a user and data already stored by the user, which hereinafter will be referred to as user storage data, are stored. The free block area is a logical block area in which the user storage data is temporarily stored in order to change a logical address of the user storage data stored in the flash memory.

The cache block area according to an exemplary embodiment of the present invention is a logical block area in which the user storage data is temporarily stored in order to unify data units that are not the same before user storage data received from the host is stored in the flash memory.

A data unit (hereinafter, referred to as a first data unit) of user storage data received from the host may be different from a data processing unit (hereinafter, referred to as a second data unit) used while processing user storage data in the flash memory according to a mapping relationship of a physical address and a logical address of the flash memory. Due to this difference between the first and second data units, a storage space of the flash memory may not be effectively used.

According to an exemplary embodiment of the present invention, the first data unit used in a file system of the host may be a sector unit, and the second data unit used by the flash memory management unit 130 may be a page unit.

User storage data that is to be newly stored may efficiently use the storage space of the flash memory, which is optimized by using the cache block area. Optimizing of the storage space of the flash memory by using the cache block area will be described later with reference to FIGS. 7 and 8.

The flash memory management unit 130 controls data storing and reading operations of the flash memory according to a request of the host. In order to obtain an effective storage space, the flash memory management unit 130 performs a data flush operation on the cache block area and an operation of rearranging a logical area of the flash memory.

Also, in order to extend durability of the flash memory, the flash memory management unit 130 may change a storage space according to the frequency of use of storage spaces. Accordingly, the flash memory management unit 130 may control reading, storing, and transferring of data of the flash memory according to a request of the host or so as to manage the flash memory.

The flash memory management unit 130 may realize a flash translation layer (FTL). The flash memory management unit 130 controls storing and reading of user storage data by considering the first and second data units.

When user storage data is to be stored in the flash memory, and the first data unit is different from the second data unit, the flash memory management unit 130 may temporarily store the user storage data in the cache block area. Similarly, when user storage data is to be read from the flash memory, the flash memory management unit 130 may read user storage data from the cache block area, wherein the first data unit is different from the second data unit. A method of storing and reading data by using a cache block area, according to an exemplary embodiment of the present invention, will be described later with reference to FIGS. 7, 10, and 11.

When the first data unit is different from the second data unit, the flash memory management unit 130 may optimize a storage space of the flash memory by transferring user storage data from the cache block area to the user block area. A data flush operation of user storage data stored in the cache block area and an operation of rearranging a logical area of the flash memory by using the cache block area, which are performed to transfer the user storage data from the cache block area to the user block area, will be described later with reference to FIGS. 8, 12, and 13.

As high capacity data increases, storage capacity of the flash memory also increases. As the storage capacity of the flash memory increases, it is required to quickly transmit data to the flash memory. Accordingly, hardware resources and software resources of the flash memory device 100, which can quickly transmit data to the flash memory, are required.

In terms of hardware, high capacity data may be stored by increasing the number of flash memories. Here, in order to control such a flash memory device 100 having a large size, the flash memories may be effectively and efficiently managed by software.

Additional operations related to changing a storage location of data, along with storing and deleting operations performed on data, may be reduced by the flash memory management unit 130 of the flash memory device 100 by using the cache block area. Accordingly, an additional operation of transferring data, time consumed to store data, and computational amount of the flash memory may be decreased.

Also, the number of data writing operations is limited in the flash memory. Accordingly, when a data writing operation is repeated more than a predetermined number of times in a predetermined area of the flash memory, the predetermined area can no longer be used. Accordingly, in order to extend durability of a storage space of the flash memory, all storage spaces may be equally used during the total life cycle of the flash memory.

In a method of managing data of a flash memory and a flash memory device using the method according to exemplary embodiments of the present invention, logical block areas such as a cache block area, a user block area, and a free block area are effectively changed, thereby evenly using storage spaces of the flash memory. Consequently, durability of the flash memory may be increased.

Figure 2:
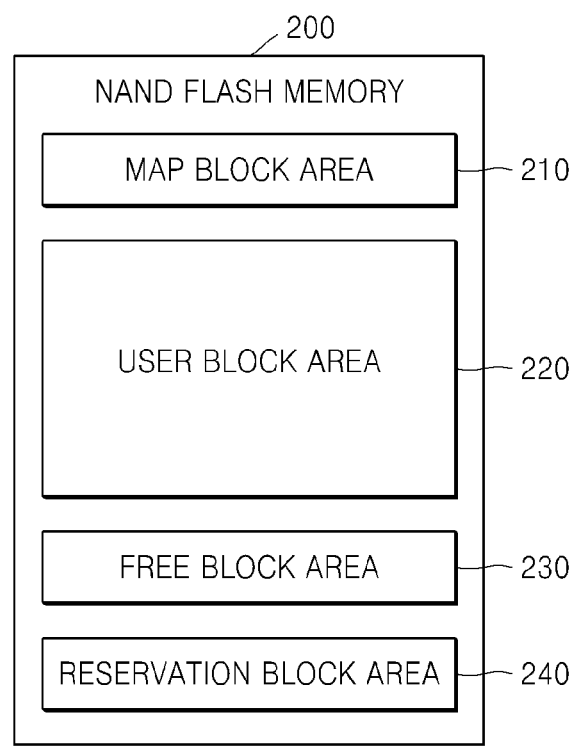
FIG. 2 is a diagram of a general logical area of a NAND flash memory.

FIG. 2 is a diagram of a general logical area of a NAND flash memory 200.

Generally, an FTL manages the NAND flash memory 200 by assigning a storage space of the NAND flash memory 200 as a map block area 210, a user block area 220, a free block area 230, and a reservation block area 240. The storage space of the NAND flash memory 200 may be assigned as a logical area including at least one logical block according to a logical address.

Each logical area of the NAND flash memory 200 includes at least one block, and each block includes at least one page. The FTL writes or reads data in a page unit.

When data is stored in the NAND flash memory 200, a physical address where the data is stored, and a logical address recognized by an external element such as a host are separately defined. The FTL generates a map table by controlling a mapping relationship between the physical address and the logical address of the data, and stores the map table in the map block area 210 of the NAND flash memory 200. User storage data is stored in a user block of the user block area 220.

In order to update data in the NAND flash memory 200, new data is written after deleting previously stored data. Also, a writing operation of data is performed in a page unit and a deleting operation of data is performed in a block unit.

The FTL assigns a predetermined area of a storage space of the NAND flash memory 200 as the free block area 230, and stores user storage data in a free block of the free block area 230 that is updated. The updated user storage data stored in the free block may be later transferred to and stored in the user block area 220 during an operation of rearranging the NAND flash memory 200.

In order to obtain a block to replace an inferior block generated in the NAND flash memory 200, the FTL assigns a predetermined area of the NAND flash memory 200 as the reservation block area 240.

In order to ensure even usage wear through wear-leveling of the NAND flash memory 200, the FTL may continuously change locations of the map block area 210, the user block area 220, the free block area 230, and the reservation block area 240.

Although not illustrated in FIG. 2, in order to write update data having a small size which is newly input to a data block in which user storage data is stored, the FTL may assign a predetermined area of the NAND flash memory 200 as a logical block for a predetermined data block. Such a logical block used to store the update data having a small size according to a data block is referred to as a log block.

A "data block" including a user block, a log block, and a free block, is a logical area in which user storage data is stored.

The FTL performs an operation of rearranging the NAND flash memory 200 so as to effectively manage a storage space, and one aspect of this operation involves garbage collection. The garbage collection includes a merge operation and a switch operation.

The merge operation collects data in a predetermined area, when a physical address is discontinuously stored or a storage space is inefficiently used since the data is dispersed in a flash memory.

The switch operation converts a predetermined block to a data block of a user block and converts an empty block to a free block, so as to obtain a free block, when data is continuously stored in a predetermined block.

Hereinafter, the merge operation will be described with reference to FIG. 3 and the switch operation will be described with reference to FIG. 4.

Figure 3:
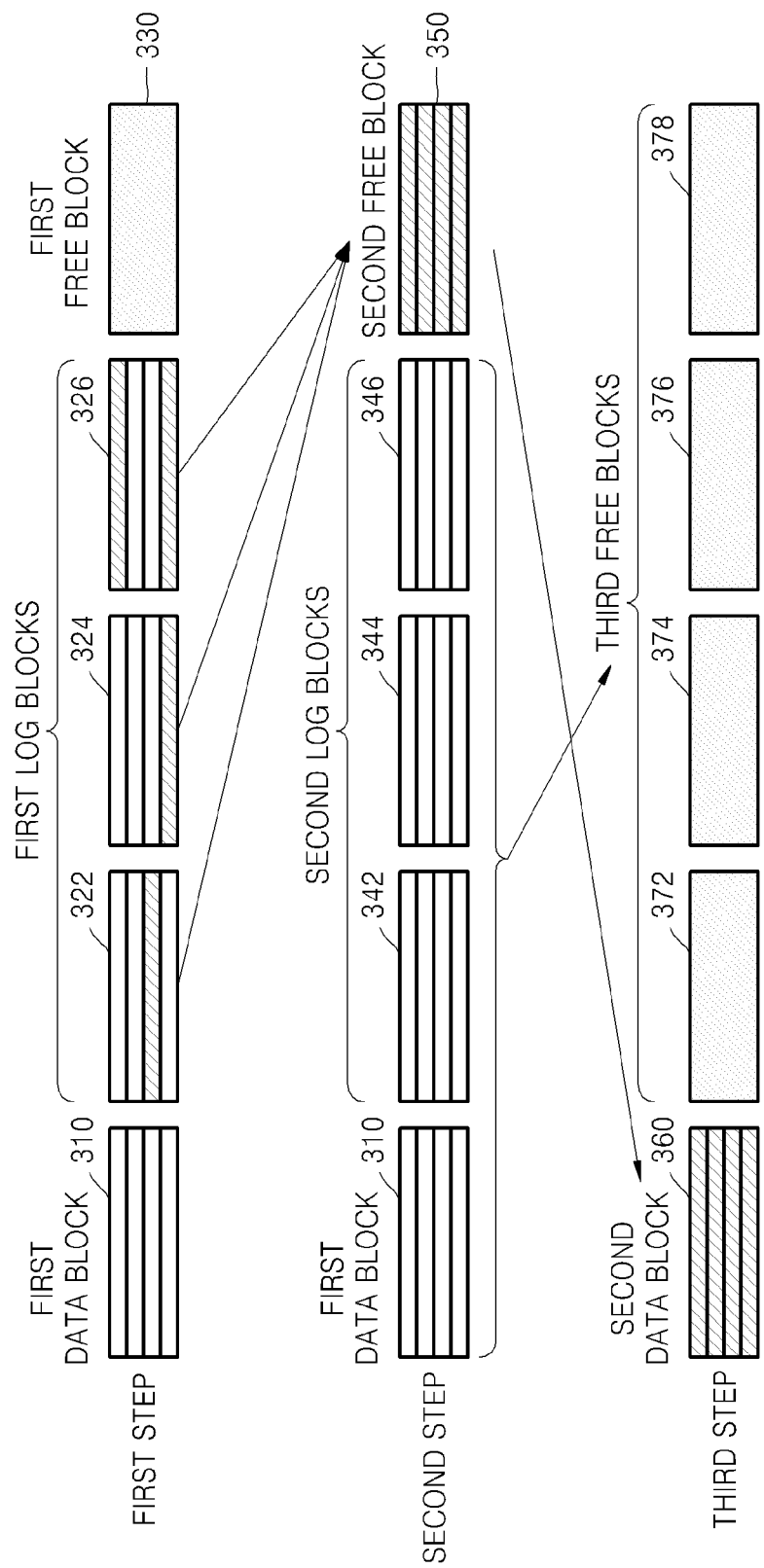
FIG. 3 is a diagram for describing a merge operation of a flash memory including a user data area, a free area, and a log block area.

FIG. 3 is a diagram for describing a merge operation of a flash memory including a user data area, a free area, and a log block area.

In a first step of the merge operation, user storage data is dispersed and stored in first log blocks 322, 324, and 326 connected to a first data block 310. A first free block 330 is an empty block.

In a second step of the merge operation, data of the first log blocks 322, 324, and 326 is copied to the first free block 330, and thus a second free block 350, in which the data is stored at a continuous address, is generated. The data of the first log blocks 322, 324, and 326 is deleted, and thus second log blocks 342, 344, and 346 become empty blocks.

In a third step of the merge operation, an FTL assigns the second free block 350 as a data block, thereby generating a second data block 360, and reassigns the empty first data block 310 and the second log blocks 342, 344, and 346 respectively as third free blocks 372, 374, 376, and 378.

Accordingly, the merge operation is required to rearrange data and efficiently manage a storage space by obtaining a free block by collecting dispersed data in a predetermined area. However, due to characteristics of a NAND flash memory, many additional operations are required to update data, such as transferring existing data to another space like a free block and then copying the existing data, so as to delete the existing data. Also, operation speed of the merge operation is slow, and thus the speed of transmitting high capacity data may decrease.

Figure 4:
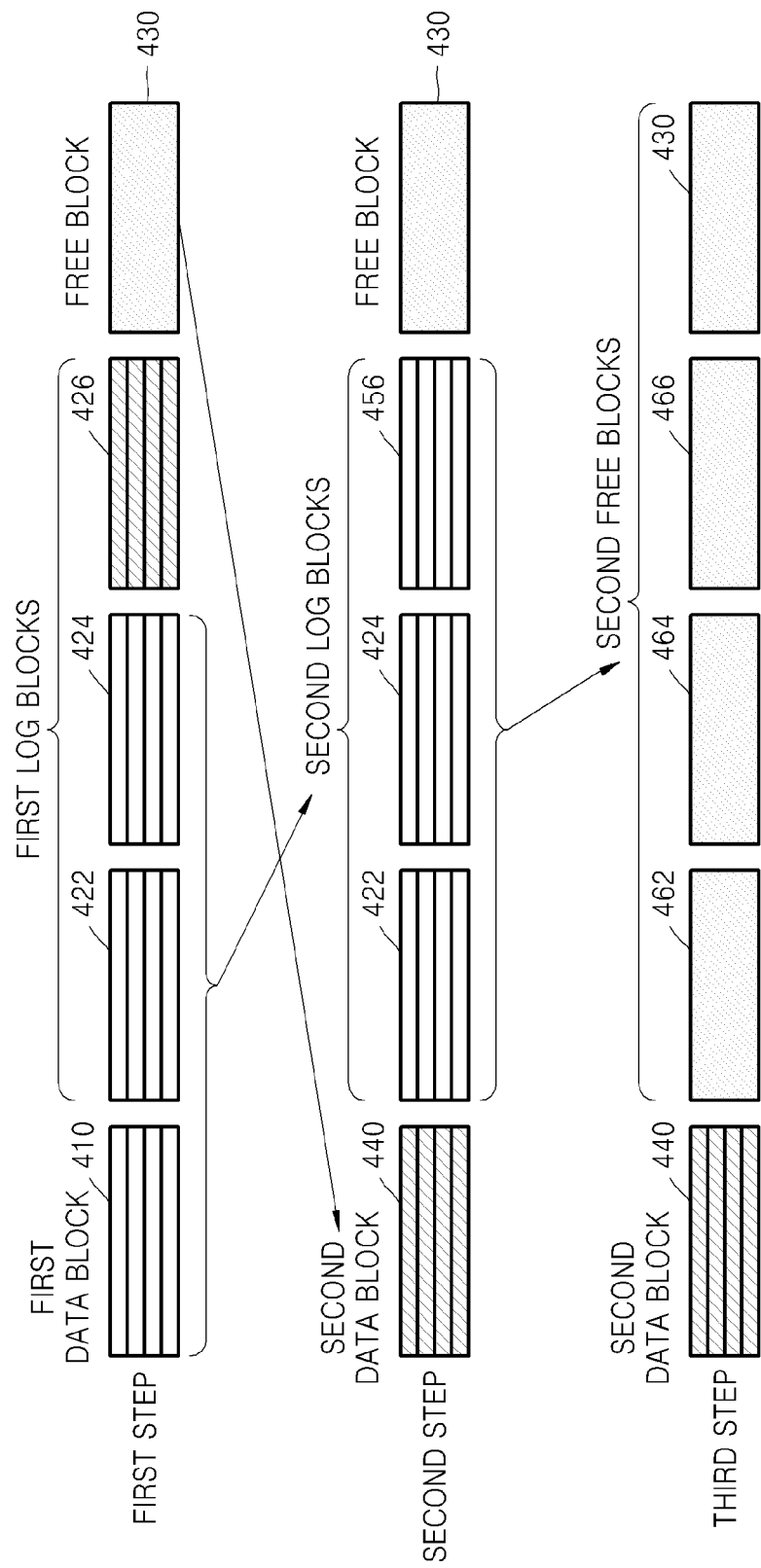
FIG. 4 is a diagram for describing a switch operation of a flash memory including a user data area, a free area, and a log block area.

FIG. 4 is a diagram for describing a switch operation of a flash memory including a user data area, a free area, and a log block area.

In a first step of the switch operation, data is stored at a continuous address in a first log block 426 from among first log blocks 422, 424, and 426 connected to a first data block 410. A free block 430 is an empty block.

In a second step of the switch operation, the first log block 426 in which the data is stored at a continuous address is converted to a data block, and is thereby assigned to a second data block 440. The first data block 410 and the first log blocks 422 and 424 that were empty blocks may respectively correspond to second log blocks 422, 424, and 456 that are empty blocks.

In a third step of the switching operation, an FTL may obtain free blocks by reassigning the second log blocks 422, 424, and 456 that are empty blocks, and the free block 430 respectively to second free blocks 462, 464, 466, and 430.

As described above, the switch operation does not perform a process of copying data from a predetermined block to another block compared to the merge operation, and thus operation speed of the switch operation may be faster than that of the merge operation. Accordingly, the switch operation is better than the merge operation so as to increase performance of data management, such as processing and transferring of data of a flash memory.

When data is written in a flash memory, the data is continuously stored, and thus the number of logical addresses continuously increases. While rearranging the flash memory, the switch operation may be performed on a data block stored at continuous logical addresses.

However, a data unit of user storage data received from a host and a data processing unit used by an FTL are generally different. As high capacity data, such as audio/video (AV) data, increases, the data processing unit expands, and thus the data processing unit of the FTL is generally larger than the data unit of a file system of the host. For example, the data unit of the file system may be 4 KB, whereas the data processing unit of the FTL may be 8 KB based on a 64 KB block.

Since the data unit of the file system of the host and the data processing unit of the FTL are different from each other, the merge operation may occur more frequently than the switch operation while rearranging a flash memory. Such a phenomenon will now be described with reference to FIG. 5.

Figure 5:
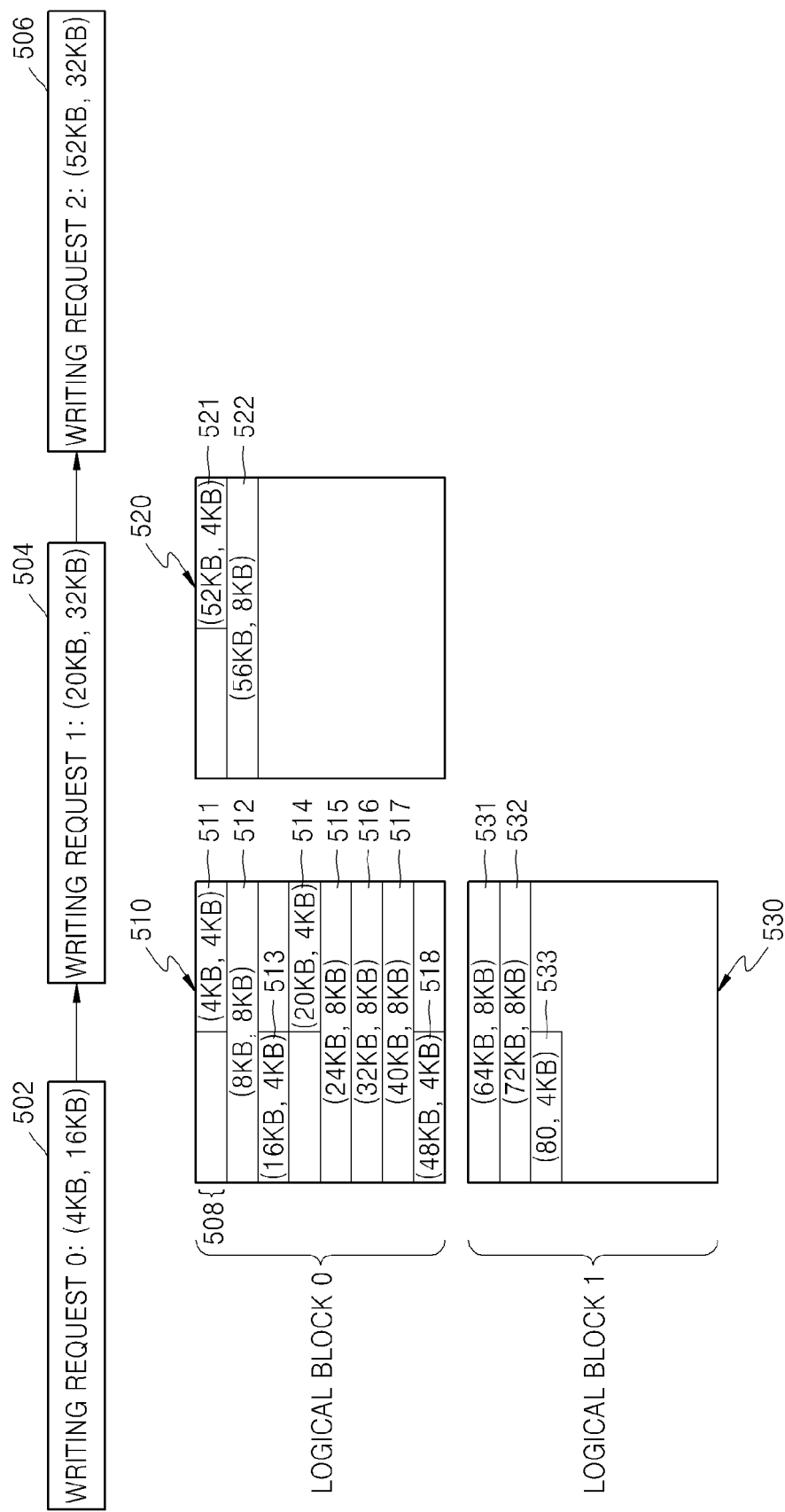
FIG. 5 is a diagram of a logical address pattern, where audio/video data is stored, of a flash memory.

FIG. 5 is a diagram of a logical address pattern, where AV data is stored, of a flash memory.

It is assumed that a flash memory device received a writing request in 3 steps from a host. A writing request 0 502 is a request to write data having a size 16 KB from a logical address 4 KB in a memory, a writing request 1 504 is a request to write data having a size 32 KB from a logical address 20 KB in a memory, and a writing request 2 506 is a request to write data having a size of 32 KB from a logical address 52 KB in a memory.

An FTL writes data in logical addresses that sequentially increase, according to the writing requests 0, 1, and 2 502, 504, and 506 of the host and size of the data. Data of logical blocks 510, 520, and 530 is processed in a page unit, and data of 8 KB may be written in one page 508.

Since data is written from the logical address 4 KB according to the writing request 0 502, the FTL stores data having a size of 16 KB by assigning the data as data 511 having a size of 4 KB, data 512 having a size of 8 KB, and data 513 having a size of 4 KB, and then storing the data 511, 512, and 513 throughout 3 pages of a logical block 0 510.

Also, since data is written from the logical address 20 KB according to the writing request 1 504, the FTL stores data having a size of 32 KB by assigning the data as data 514 having a size of 4 KB, data 515 having a size of 8 KB, data 516 having a size of 8 KB, data 517 having a size of 8 KB, and data 518 having a size of 4 KB, and then storing the data 514 through 518 throughout 5 pages of the logical block 0 510. Here, the data is written from the logical address 20 KB, but since a corresponding page is already processed by the writing request 0 502, the data 514 is written from a next page.

Data is written from the logical address 52 KB according to the writing request 2 506, but since exemplary logical blocks of FIG. 5 are in 64 KB units, a starting address of a logical block 1 530, which is a following block of the logical block 0 510, is mapped to 64 KB. Accordingly, the FTL assigns a log block 520 for the logical block 0 510, and maps a logical address 52 KB to the log block 520 so as to store data 521 having a size of 4 KB and data 522 having a size of 8 KB.

When it is time to write data having a starting address of 64 KB while performing the writing request 2 506, the FTL starts to write the data in the logical block 1 530. Accordingly, the FTL stores data 531 having a size of 8 KB, data 532 having a size of 8 KB, and data 533 having a size of 4 KB throughout 3 pages of the logical block 1 530.

A data unit of a file system of the host is 4 KB, and a data processing unit of the FTL is 8 KB, and thus the data unit and the data processing unit are not identical. Accordingly, data having a size of 8 KB cannot be written on one page of the FTL, but only data having a size of 4 KB, such as the data 511, 513, 518, 522, and 533, is written.

When only the data having a size of 4 KB is written in one page, the merge operation using a free block must be performed while rearranging a flash memory, and thus throughput increases.

Figure 6:
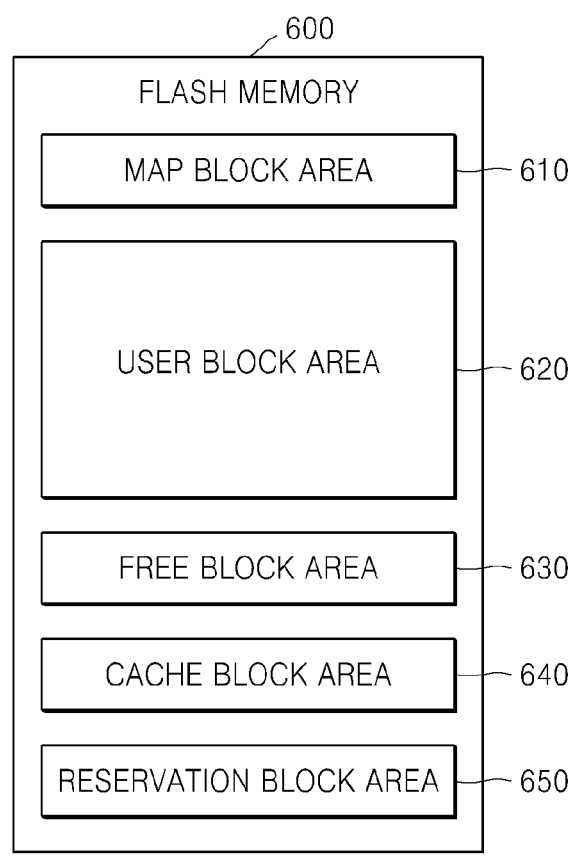
FIG. 6 is a diagram of a logical area of a flash memory, according to an exemplary embodiment of the present invention.

FIG. 6 is a diagram of a logical area of a flash memory 600, according to an exemplary embodiment of the present invention.

The flash memory management unit 130 of FIG. 1 manages the flash memory 600 by assigning the flash memory 600 as a map block area 610, a user block area 620, a free block area 630, a cache block area 640, and a reservation block area 650. Functions of the map block area 610, the user block area 620, the free block area 630, and the reservation block area 650 are identical to the functions of the map block area 210, the user block area 220, the free block area 230, and the reservation block area 240 described above with reference to FIG. 2.

When a first data unit of user storage data received from a host is different from a second data unit used to process user storage data in the flash memory 600 according to a mapping relationship of a physical address and a logical address, the flash memory management unit 130 assigns a part of the flash memory 600 as the cache block area 640. While processing the user storage data received from the host, the flash memory management unit 130 may temporarily store user storage data smaller than the second data unit in the cache block area 640.

For example, when the flash memory management unit 130 realizes an FTL, a plurality of data processing requests are received from the host based on a 4 KB data unit, and the flash memory management unit 130 may process data in a page unit having a size of 8 KB. Accordingly, when data having a size of 4 KB is to be processed, the flash memory management unit 130 may use the cache block area 640.

For example, referring to FIG. 5, the data 511, 513, 518, 521, and 533 having a size of 4 KB may be stored in the cache block area 640. A detailed example of using the cache block area 640 will now be described with reference to FIGS. 7 through 13.

Figure 7:
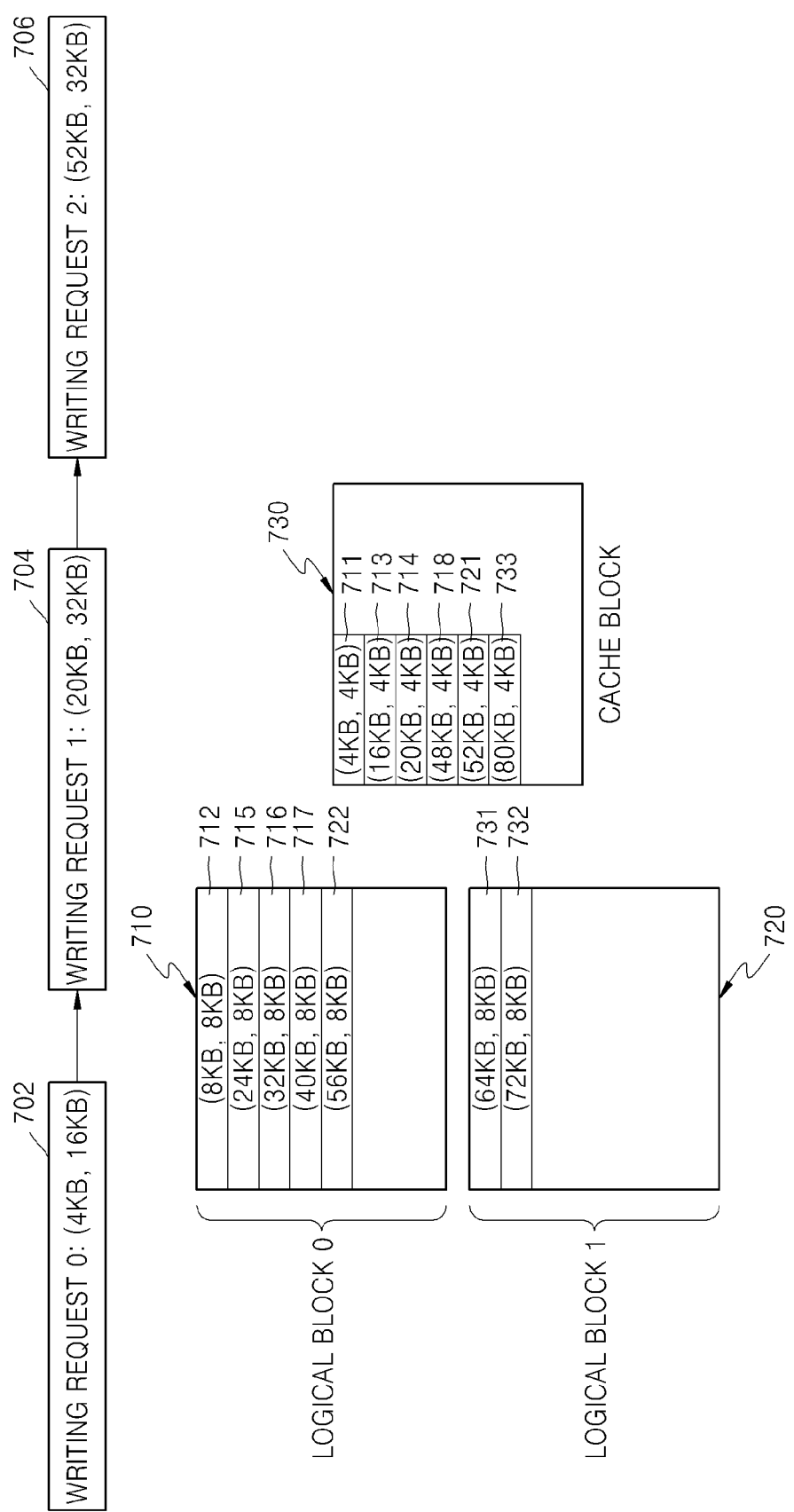
FIG. 7 is a diagram of a logical address pattern, where AV data is stored by using a cache block, according to an exemplary embodiment of the present invention.

FIG. 7 is a diagram of a logical address pattern, where AV data is stored by using a cache block, according to an exemplary embodiment of the present invention.

Similar to FIG. 5, it is assumed that the flash memory device 100 receives a writing request in 3 steps from a host. A writing request 0 702 is a request to write data having a size of 16 KB from a logical address 4 KB in a memory, a writing request 1 704 is a request to write data having a size of 32 KB from a logical address 20 KB in a memory, and a writing request 2 706 is a request to write data having a size of 32 KB from a logical address 52 KB in a memory.

Data having a size of 16 KB is stored in one page from a logical address 4 KB according to the writing request 0 702. The flash memory management unit 130 stores the data having a size of 4 KB in a cache block 730. Accordingly, data 711 having a size of 4 KB corresponding to the writing request 0 702 is stored in the cache block 730.

Data 712 having a size of 8 KB following the data 711 having a size of 4 KB corresponds to a size of one page, and thus is stored in a logical block 0 710. Data 713 having a size of 4 KB following the data 712 is stored in the cache block 730.

Since data having a size of 32 KB is written from a logical address 20 KB according to the writing request 1, an FTL stores data 714 having a size of 4 KB in the cache block 730. Similarly, data 715, 716, and 717 having a size of 8 KB is stored in the logical block 0 710. The FTL may store remaining data 718 having a size of 4 KB in the cache block 730.

Since data having a size of 32 KB is written from a logical address 52 KB according to the writing request 2 706, the FTL stores data 721 having a size of 4 KB in the cache block 730. Similarly, data 722, 731, and 732 having a size of 8 KB is sequentially stored in the logical block 0 710 or a logical block 1 720, according to a mapped logical address. Remaining data 733 having a size of 4 KB may be stored in the cache block 730.

Accordingly, data having a size smaller than one page is stored in the cache block 730, and thus data having a size of 8 KB is sequentially aligned and stored in the logical blocks 0 and 1 710 and 720 according to each page.

In other words, the flash memory management unit 130 processes data in relation to a logical block, when a first data unit (data unit of a file system of a host) and a second data unit (a data processing unit of the flash memory management unit 130) are identical. However, when the first data unit and the second data unit are different from each other, data is processed in relation to a cache block.

Figure 8:
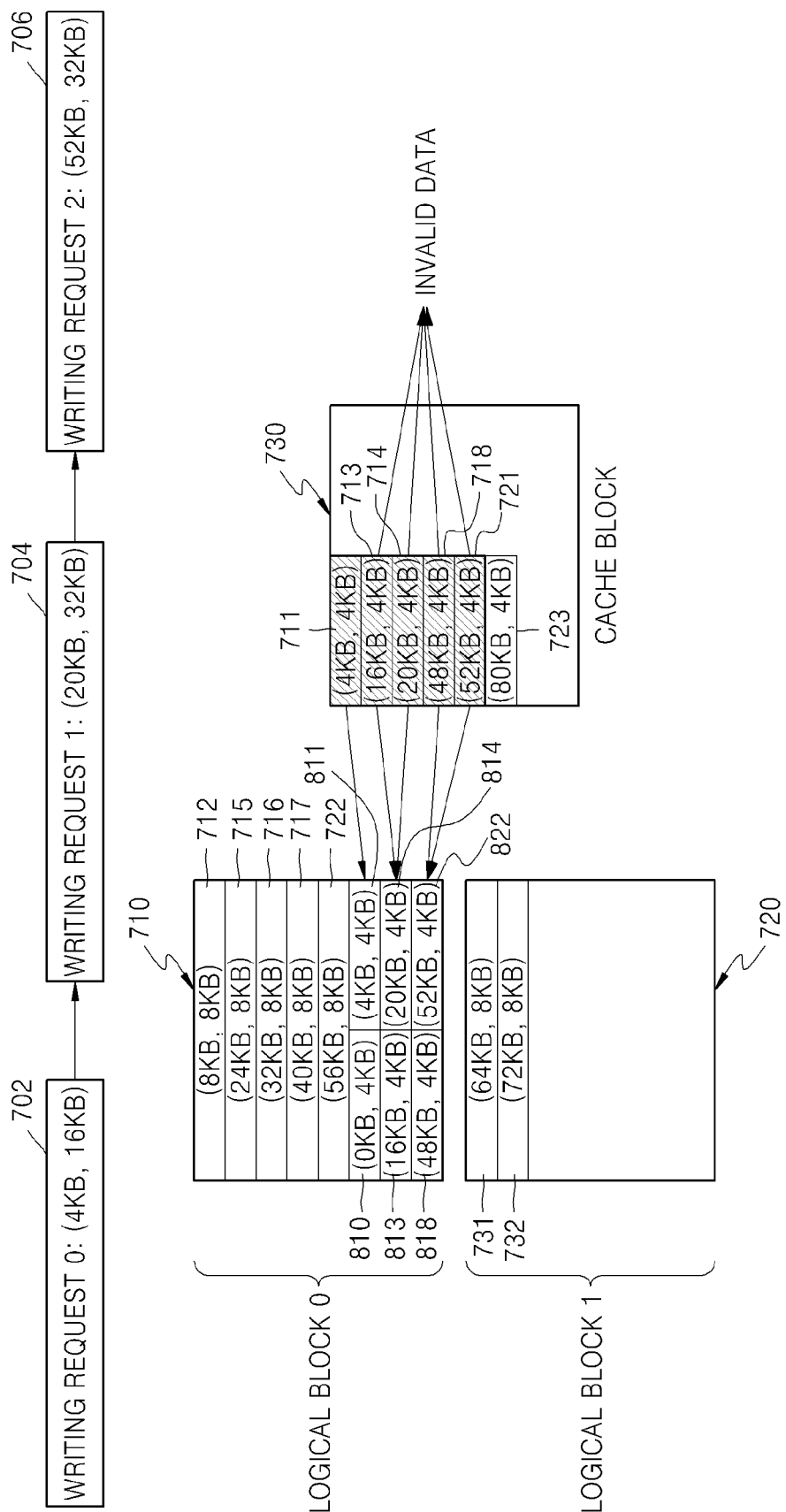
FIG. 8 is a diagram for describing a data flush operation performed on user storage data stored in a cache block, according to an exemplary embodiment of the present invention.

FIG. 8 is a diagram for describing a data flush operation performed on user storage data stored in a cache block 730, according to an exemplary embodiment of the present invention.

When data is written by using a cache block according to the exemplary embodiment of FIG. 7, a data flush operation may be performed on data stored in the cache block 730. The flash memory management unit 130 may collect data that has a size of 8 KB from among the data stored in the cache block 730 and copy the data that has a size of 8 KB in one page of a logical block.

However, since a writing request 0 702 requests to write data from a logical address 4 KB, the flash memory management unit 130 may copy data 810 of a logical address 0 to 4 KB, wherein the data 810 does not correspond to data corresponding to the writing request 0 702, from another storage space in a flash memory. The data 711 having a size of 4 KB of the cache block 730 may be copied to a following storage space of the data 810.

The data 713, 714, 718, and 722 having a size of 4 KB of the cache block 730 is copied to the logical block 0 710, so as to sequentially store a pair of pieces of data 813 and 814, and 818 and 822, per one page.

The flash memory management unit 130 may display data in the cache block 730 that is finished being copied to the logical block 0 710 as invalid data. When all pieces of data in the cache block 730 are displayed as invalid data, the flash memory management unit 130 deletes all the pieces of data in the cache block 730, and reassigns the empty cache block 730 as a free block.

According to the data flush operation, data stored in a cache block is copied to a data block, thereby increasing efficiency of a storage space of a logical block. Also, by deleting the data in the cache block that is copied to the data block and converting the cache block to a free block, a pool of free blocks is obtained.

According to such a data flush operation, update data is aligned and stored in the logical block 0 710 without an empty storage space. The logical block 0 710 having aligned data may be processed later via a switching operation during an operation of rearranging a storage space of a flash memory, such as garbage collection.

Figure 9:
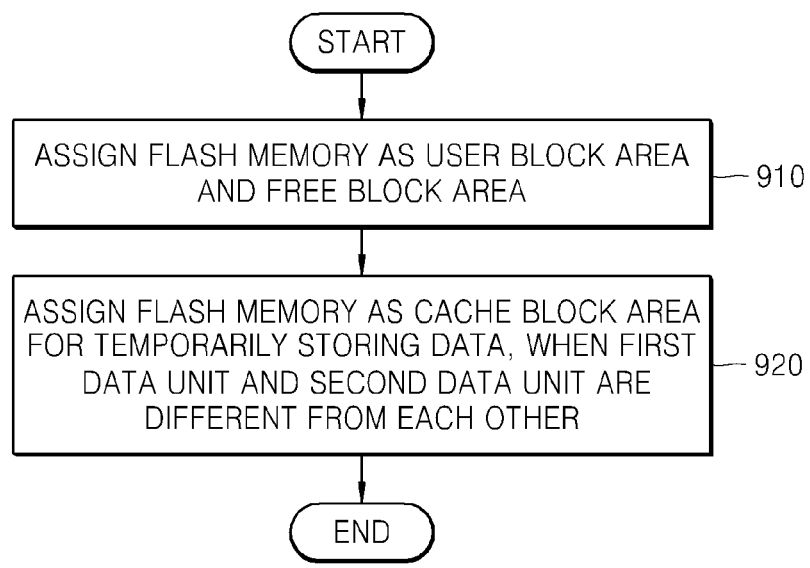
FIG. 9 is a flowchart illustrating a method of managing data of a flash memory, according to an embodiment of the present invention.

FIG. 9 is a flowchart illustrating a method of managing data of a flash memory, according to an exemplary embodiment of the present invention.

In operation 910, a logical area of the flash memory may be assigned as a user block area and a free block area.

In operation 920, when a first data unit of user storage data received from a host is different from a second data unit used while processing data of the flash memory according to a mapping relationship between a physical address and a logical address, a predetermined logical area of the flash memory may be assigned as a cache block area for temporarily storing the user storage data received from the host.

In the method according to an exemplary embodiment, efficiency of a storage space of the flash memory increases since data having a size smaller than the second data unit is stored in a cache block, and only data having a size of the second data unit is sequentially stored in a data block.

Specifically, high capacity AV data may be written sequentially, and thus data writing and processing speed is high when the method according to an exemplary embodiment of the present invention is used.

A logical block in which data is aligned by using the cache block may be processed via a switching operation during an operation of rearranging a storage space of the flash memory, such as a garbage collection operation. Computational amount of the switch operation is much lower than computational amount of a merge operation that requires additional data copying and deleting operations.

Also, the number of switching operations increases as frequency of inputting and outputting data is high in the cache block area, and a number of logical areas in which data is sequentially stored in continuous pages is high, and thus a wear-leveling effect increases.

Figure 10:
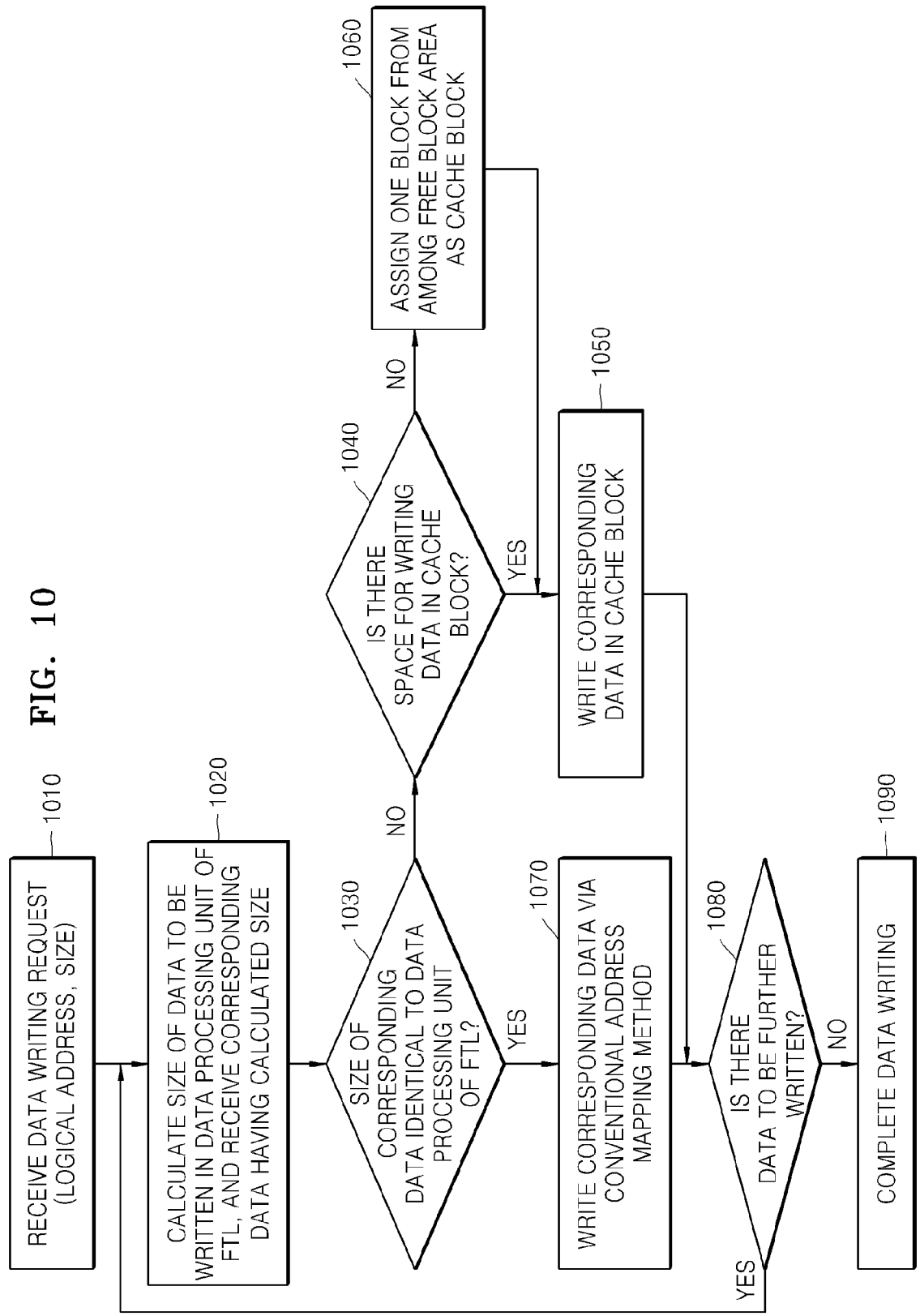
FIG. 10 is a flowchart illustrating a method of writing user storage data in a flash memory by using a cache block, according to an exemplary embodiment of the present invention.

FIG. 10 is a flowchart illustrating a method of writing user storage data in a flash memory by using a cache block, according to an exemplary embodiment of the present invention. Here, the flash memory management unit 130 may relay a host and a flash memory via an FTL.

In operation 1010, the flash memory device 100 receives a data writing request from the host. The data writing request may request information about a logical address and the total size of data.

In operation 1020, the flash memory management unit 130 calculates the size of data to be written in a current data processing unit in relation to an address mapping operation of the FTL, and receives corresponding data having the calculated size from among data corresponding to the data writing request. According to an exemplary embodiment, the data processing unit includes a page.

In operation 1030, it is determined whether the size of corresponding data received in operation 1020 is identical to a data processing unit of the FTL. If the size of corresponding data is identical to the data processing unit, operation 1070 is performed so as to store the corresponding data in a suitable area by mapping a logical address to a physical address of the flash memory.

If the size of the corresponding data is different from the data processing unit, operation 1040 is performed. In operation 1040, it is determined whether there is a space for writing data in a cache block. If there is a space, operation 1050 is performed so as to write the corresponding data in the cache block.

If it is determined that there is no space for writing data corresponding to the data processing unit in the cache block in operation 1040, operation 1060 is performed. In operation 1060, the flash memory management unit 130 assigns one block from among a free block area as a cache block, and then operation 1050 is performed so as to write the corresponding data in the cache block.

In operation 1080, it is determined whether there is data to be further written corresponding to the data writing request of operation 1010, after the corresponding data is written. If there is data to be further written, operation 1020 is performed, and if there is no data to be further written, operation 1090 is performed so as to complete data writing.

Figure 11:
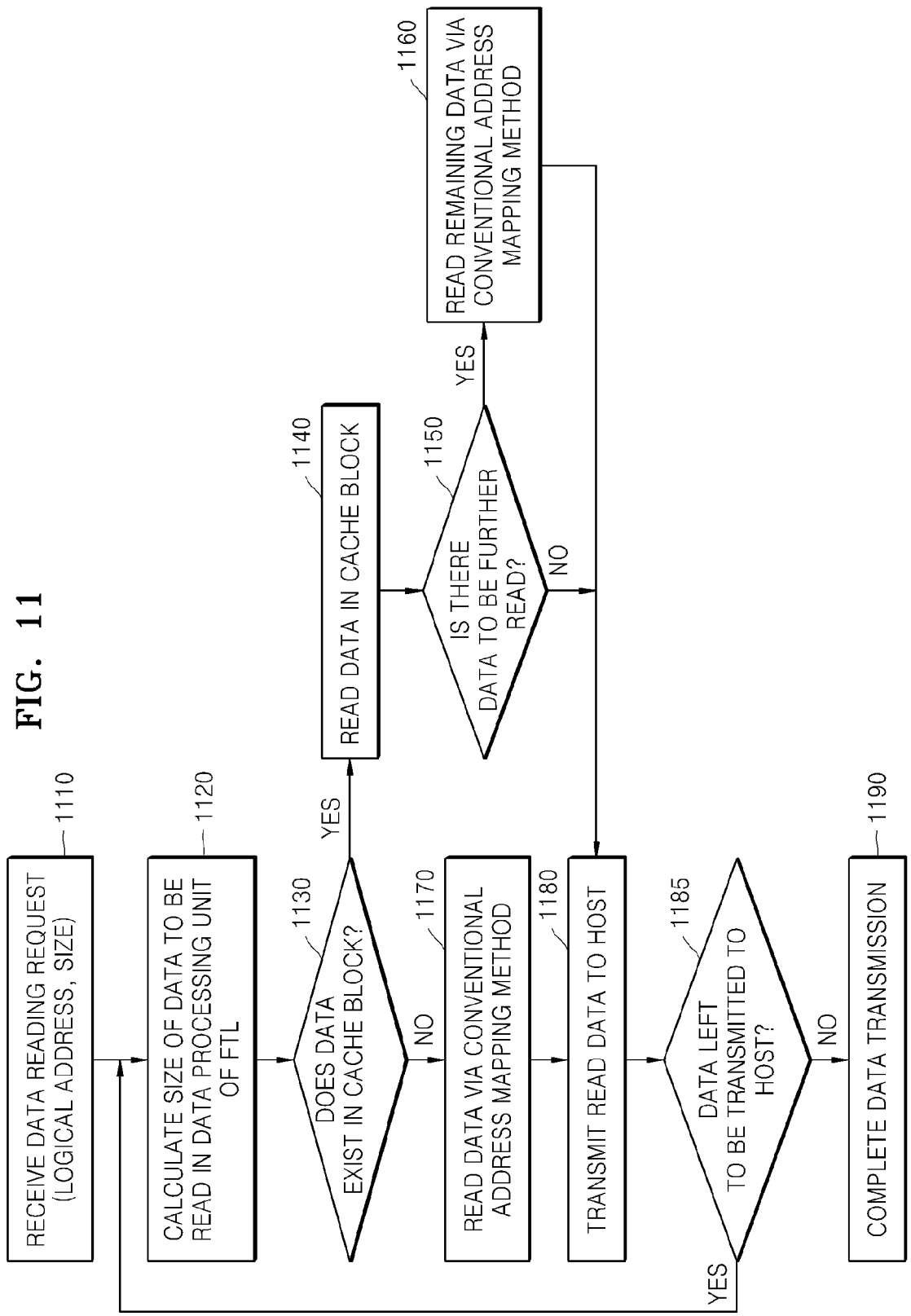
FIG. 11 is a flowchart illustrating a method of reading user storage data from a flash memory by using a cache block, according to an exemplary embodiment of the present invention.

FIG. 11 is a flowchart illustrating a method of reading user storage data from a flash memory by using a cache block, according to an exemplary embodiment of the present invention. According to an exemplary embodiment, data may be read from the flash memory as the flash memory management unit 130 realizes a flash memory layer.

In operation 1110, the flash memory device 100 receives a data reading request form a host. The data reading request may request information about a logical address and information about the total size of data.

In operation 1120, the flash memory management unit 130 calculates the size of data to be read in a data processing unit of an FTL.

In operation 1130, it is determined whether the data to be read exists in a cache block. If the data does not exist in the cache block, operation 1170 is performed so that the flash memory management unit 130 reads the data from a predetermined block in the flash memory according to a map table. In operation 1180, the read data is transmitted to the host.

If the data exists in the cache block, the flash memory management unit 130 reads the data from the cache block in operation 1140. Then, it is determined whether there is data to be further read in operation 1150. If there is data to be further read in the cache block, remaining data is read from a predetermined data block of the flash memory in operation 1160. Then, the remaining data is transmitted to the host in operation 1180.

In operation 1185, it is determined whether there is any data remaining to be transmitted to the host. Based on operation 1185, operation 1120 may be performed or operation 1190 may be performed to complete the data transmission.

Figure 12:
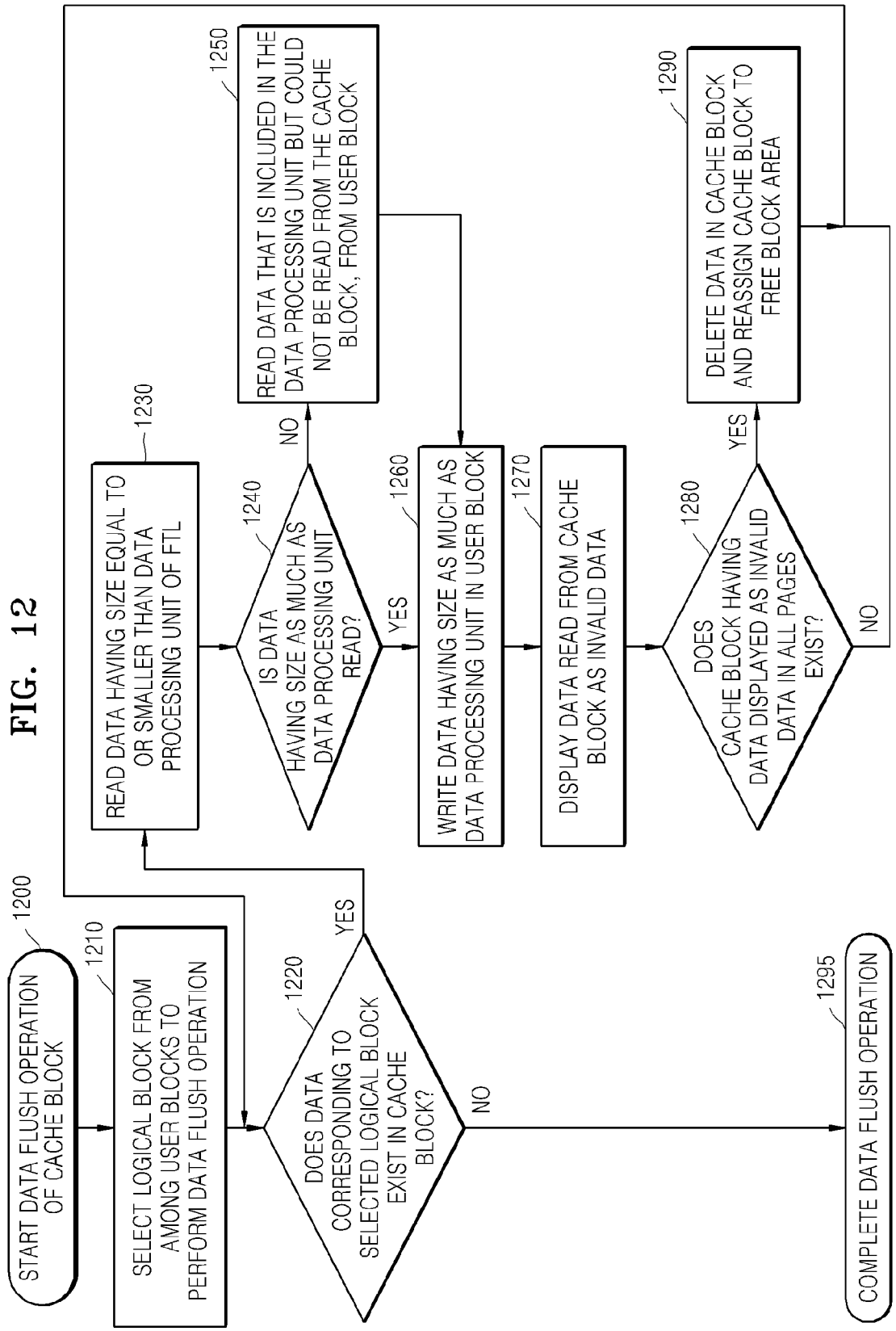
FIG. 12 is a flowchart illustrating a data flush operation performed on user storage data stored in a cache block, according to an exemplary embodiment of the present invention.

FIG. 12 is a flowchart illustrating a data flush operation performed on user storage data stored in a cache block, according to an exemplary embodiment of the present invention.

In operation 1200, a data flush operation of the cache block is started.

In operation 1210, the flush memory management unit 130 selects a logical block from among user blocks to perform the data flush operation.

In operation 1220, it is determined whether data corresponding to the selected logical block exists in the cache block. If the data does not exist in the cache block, the data flush operation ends in operation 1295.

In operation 1230, the flush memory management unit 130 reads data having a size equal to or smaller than a data processing unit of an FTL from the cache block.

In operation 1240, it is determined whether data having a size equal to that of a data processing unit is read from the cache block. In other words, it is determined whether the size of the data read from the cache block is identical to the data processing unit of the FTL. If the data having a size equal to that of the data processing unit of the FTL is read, operation 1260 is performed so that the flush memory management unit 130 stores the read data in a user block.

If it is determined that the size of the data read from the cache block is smaller than the data processing unit of the FTL in operation 1240, the flash memory management unit 130 may read data having a size calculated by subtracting the size of the data read from the cache block from the data processing unit, from the size of the data block, in operation 1250. Here, the data read in operations 1230 and 1250 may be copied to the user block in operation 1260.

In operation 1270, the flash memory management unit 130 displays the data copied to the user block, from among the data of the cache block, as invalid data.

In operation 1280, the flash memory management unit 130 detects whether there is a cache block having data displayed as invalid data in all pages. In operation 1290, data of the cache block having data displayed as invalid data in all pages is deleted, and the cache block is reassigned to a free block area. If there are no more cache blocks having data displayed as invalid data in all pages, operation 1220 is performed.

Figure 13:
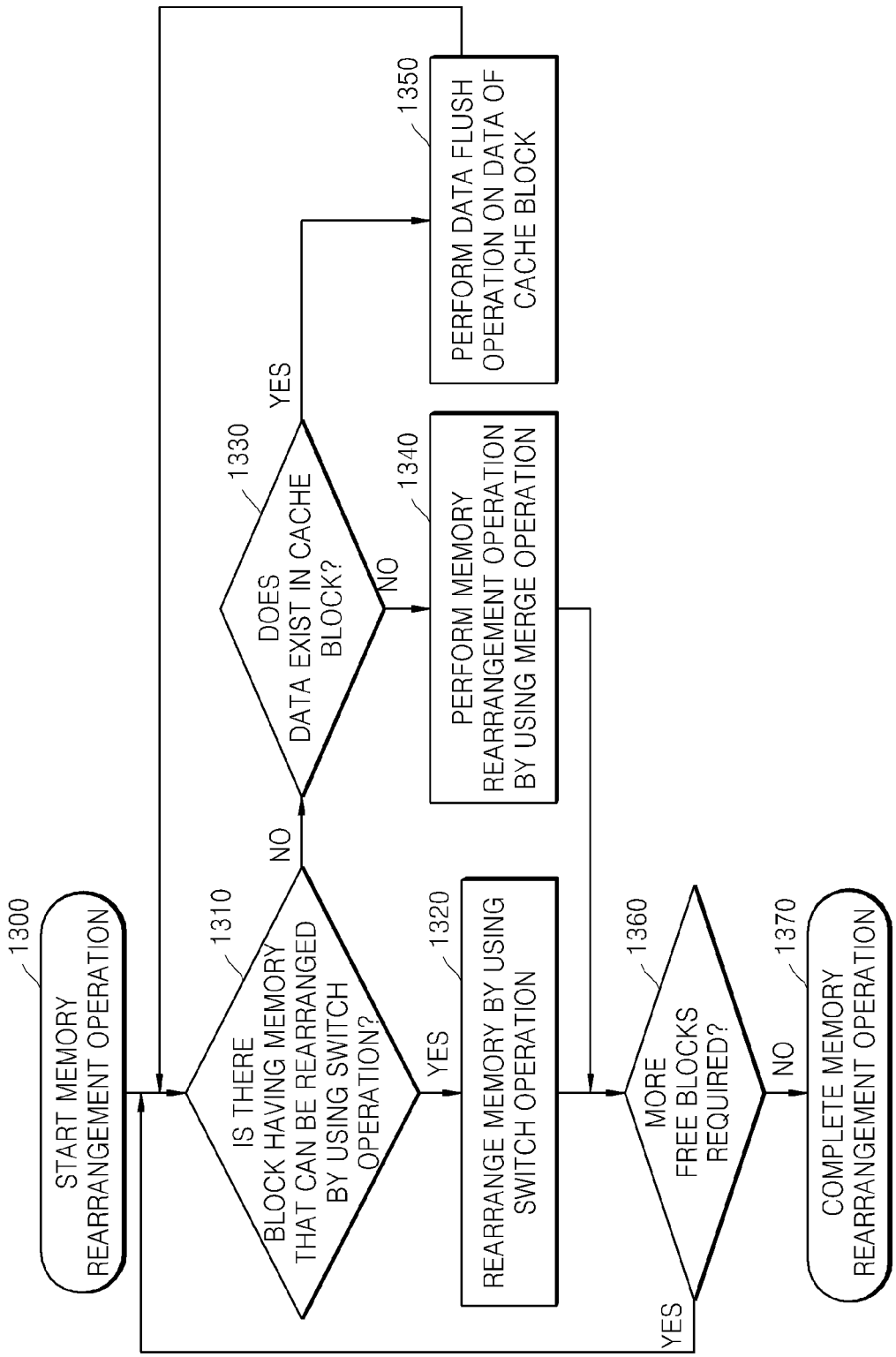
FIG. 13 is a flowchart illustrating a method of rearranging a flash memory by using a cache memory, according to an exemplary embodiment of the present invention.

FIG. 13 is a flowchart illustrating a method of rearranging a flash memory by using a cache memory, according to an exemplary embodiment of the present invention. In operation 1300, a memory rearrangement operation is started.

In operation 1310, the flash memory management unit 130 determines whether there is a block from among logical blocks that has a memory that can be rearranged by using a switch operation, and rearranges the memory by using the switch operation in operation 1320 based on a result of the determination in operation 1310. A block that has a memory that can be rearranged by using a switch operation may include a block in which data is stored according to sequential logical addresses without an empty storage space.

If it is determined that there is no block to perform the switch operation, it is determined whether data exists in a cache block in operation 1330. If there is no data in the cache block, the flash memory management unit 130 may perform the memory rearrangement operation by using a merge operation in operation 1340.

If it is determined that data exists in the cache block, the flash memory management unit 130 performs a data flush operation on the data of the cache block in operation 1350. The data of the cache block is copied in such a way that data is sequentially stored at a logical address of the logical block via the data flush operation, and thus efficiency of a storage space of the logical block increases. Then, operation 1310 is performed again, and thus the flash memory management unit 130 searches again for a block on which a switch operation can be performed.

After the memory rearrangement operation is performed by using the switch operation or the merge operation, it is determined whether a free block is further required in operation 1360. If the free block is further required, operation 1310 is performed again, and when the number of free blocks is sufficient, the memory rearrangement operation is completed in operation 1370.

Accordingly, in the method illustrated in FIG. 9, data is stored in a cache block when a data unit of a file system of a host is different from a data processing unit of an FTL, and thus efficiency of storage spaces of logical blocks is increased in the methods of FIGS. 10 and 11.

Also, a cache block and other logical blocks are rearranged by performing a data flush operation of FIG. 12 and a memory rearrangement operation of FIG. 13 on data stored in the cache block, and thus efficiency of a storage space is increased, and an effect of wear-leveling is increased.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and other storage media.

While this invention has been particularly shown and described with reference to preferred exemplary embodiments thereof, it will be understood by those of ordinary skill in the art that various changes in form and details may be made therein without departing from the spirit and scope of the invention as defined by the appended claims. The preferred exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of managing data of a flash memory, the method comprising:
    assigning a logical area of the flash memory as a user block area operable to store user storage data, and a free block area in which the user storage data is operable to be temporarily stored when changing a logical address of the user storage data; and
    assigning a predetermined logical area of the flash memory as a cache block area in which the user storage data received from the host is temporarily stored, if a first data unit of the user storage data received from the host is different from a second data unit used while mapping a physical address to a logical address of the flash memory where the user storage data is stored.

2. The method of claim 1, further comprising:
    receiving a data writing request from the host; and
    storing the user storage data received from the host in at least one of the user block area, the free block area, and the cache block area, based on a result of comparing a size of the first data unit of the user storage data received from the host and a size of the second data unit.

3. The method of claim 2, wherein the storing of the user storage data comprises storing the first data unit of the user storage data in the cache block area if the result of the comparing determines that the size of the first data unit of the user storage data and the size of the second data unit are different.

4. The method of claim 3, wherein the cache block area is a current cache block area, and wherein the storing of the user storage data in the current cache block area comprises:
    assigning a new cache block area from the free block area, if the current cache block area has insufficient space for storing the user storage data received from the host; and
    storing the user storage data received from the host in the new cache block area.

5. The method of claim 2, wherein the storing of the user storage data comprises storing the first data unit of the user storage data in at least one of the user block area and the free block area if the result of the comparing determines that the size of the first data unit of the user storage data and the size of the second data unit are the same.

6. The method of claim 1, further comprising:
    receiving a data reading request from the host; and
    reading data corresponding to the data reading request from at least one of the user block area, the free block area, and the cache block area.

7. The method of claim 6, wherein the reading of the data corresponding to the data reading request comprises:
    determining first data having a size of the second data unit from among the data corresponding to the data reading request; and
    searching for the first data in the cache block area.

8. The method of claim 7, wherein the reading of the data corresponding to the data reading request further comprises reading the first data from the cache block area if the first data is stored in the cache block area, based on a result of the searching.

9. The method of claim 7, wherein the reading of the data corresponding to the data reading request further comprises reading the first data from at least one of the user block area and the free block area if the first data is not stored in the cache block area, based on a result of the searching.

10. The method of claim 1, further comprising performing a data flush operation on a predetermined block of the user block area, using data stored in the cache block area.

11. The method of claim 10, wherein the performing of the data flush operation comprises:
    reading at least one piece of data having a size equal to or smaller than the second data unit from a first cache block of the cache block area and copying and transferring the at least one piece of data to a predetermined block of the user block area; and
    deleting data from the first cache block, including the at least one piece of data which was copied and transferred to the predetermined block of the user block area.

12. The method of claim 11, wherein the reading and copying of the at least one piece of data comprises:
reading at least one piece of data having a size smaller than the second data unit from the user block area; and
copying and transferring the read at least one piece of data to the predetermined block of the user block area.

13. The method of claim 11, wherein the deleting of the data of the first cache block comprises reassigning the first cache block, in which the data was deleted, to the free block area.

14. The method of claim 11, wherein the reading and copying of the at least one piece of data comprises displaying the at least one piece of data stored in the cache block area as invalid data after the at least one piece of data is copied and transferred to the predetermined block of the user block area, and
the deleting of the first cache block of the cache block area comprises deleting data of the first cache block after the data of the first cache block is displayed as invalid data.

15. The method of claim 1, further comprising assigning a predetermined area of the flash memory as at least one log block for writing update data newly input to a predetermined block of the user block area.

16. The method of claim 15, further comprising rearranging the update data stored in the log block, based on whether data is continuously stored in the log block.

17. The method of claim 16, wherein the rearranging of the update data comprises performing a switch operation that rearranges the update data by reassigning the log block in the user block area, if the data is continuously stored in one log block of a predetermined block of the user block area.

18. The method of claim 16, wherein the rearranging of the update data comprises determining whether user storage data corresponding to a predetermined block of the user block area is stored in the cache block area, if user storage data is not stored in one log block for the predetermined block of the user block area.

19. The method of claim 18, wherein the rearranging of the update data further comprises performing a merge operation, which collects and continuously stores user storage data that is dispersively stored, in one block by using a predetermined free block of the free block area, and
rearranges the update data by reassigning the predetermined free block as the user block area, if the user storage data corresponding to the predetermined block of the user block area is not stored in the cache block area.

20. The method of claim 18, wherein the rearranging of the update data further comprises performing a data flush operation on the user storage data corresponding to the predetermined block of the user block area, if the user storage data corresponding to the predetermined block of the user block area is stored in the cache block area,
wherein the data flush operation copies the user storage data in the cache block area and transfers the copied user storage data to the user block area based on the second data unit, and deletes the user storage data in the cache block area.

21. A flash memory device comprising:
a memory unit that comprises at least one flash memory;
a data input and output unit that inputs and outputs user storage data between the memory unit and a host; and
a flash memory management unit that manages a data storage area and data of the flash memory by assigning a logical area of the flash memory as a user block area operable to store the user storage data, and a free block area operable to temporarily store the user storage data when changing a logical address of the user storage data,
wherein if a first data unit of user storage data received from the host is different from a second data unit used while mapping a physical address to a logical address of the flash memory where user storage data is stored, the first data unit of the user storage data received from the host is temporarily stored in a cache block area of the flash memory.

22. The flash memory device of claim 21, wherein the flash memory management unit stores the first data unit of the user storage data received from the host in at least one of the user block area, the free block area, and the cache block area, based on a result of comparing a size of the first data unit of the user storage data received from the host and a size of the second data unit, when a data writing request is received from the host.

23. The flash memory device of claim 22, wherein the flash memory management unit stores the first data unit of the user storage data in the cache block area if the result of the comparing determines that a size of the first data unit of the user storage data has and the size of the second data unit are different.

24. The flash memory device of claim 23, wherein the flash memory management unit stores the first data unit of the user storage data in at least one of the user block area and the free block area if the result of the comparing determines that a size of the first data unit and the size of the second data unit are the same.

25. The flash memory device of claim 21, wherein when a data reading request is received from the host, the flash memory management unit reads data corresponding to the data reading request from at least one of the user block area, the free block area, and the cache block area.

26. The flash memory device of claim 25, wherein the flash memory management unit reads first data having a size of the second data unit from among the data corresponding to the data reading request from the cache block area, when the first data is stored in the cache block area.

27. The flash memory device of claim 21, wherein the flash memory management unit performs a data flush operation where at least one piece of data having a size equal to or smaller than the second data unit is read from a first cache block of the cache block area,
the at least one piece of data is copied and transferred to a predetermined block of the user block area, and
data of the first cache block, including the at least one piece of data which was copied and transferred to the user block area, is deleted.

28. The flash memory device of claim 27, wherein the data flush operation reads at least one piece of data having a size smaller than the second data unit from the cache block area and copies and transfers the at least one piece of data to the predetermined block of the user block area.

29. The flash memory device of claim 27, wherein the data flush operation reassigns the first cache block, in which the data was deleted, to the free block area.

30. The flash memory device of claim 21, wherein the flash memory management unit performs an operation of rearranging update data stored in a log block, based on whether data is continuously stored in the log block, wherein the log block is assigned as a predetermined area of the flash memory so as to write the update data newly input in a predetermined block of the user block area.

31. The flash memory device of claim 30, wherein the operation of rearranging the update data comprises a data flush operation that copies user storage data of the cache block area and transfers the copied data to the user block area based on the second data unit and deletes the user storage data of the cache block area, when user storage data is discontinuously and dispersively stored in at least one log block of a predetermined block of the user block area.

32. The flash memory device of claim 30, wherein the operation of rearranging the update data comprises a switch operation operative to rearrange the update data by reassigning the log block to the user block area, when data is continuously stored in one log block for a predetermined block of the user block area.

33. A non-transitory computer readable recording medium having embodied thereon a program for executing the method comprising:
   assigning a logical area of the flash memory as a user block area operable to store user storage data, and a free block area in which the user storage data is operable to be temporarily stored when changing a logical address of the user storage data; and
   assigning a predetermined logical area of the flash memory as a cache block area in which the user storage data received from the host is temporarily stored, if a first data unit of the user storage data received from the host is different from a second data unit used while mapping a physical address to a logical address of the flash memory where the user storage data is stored.

* * * * *